US000001882H

United States Statutory Invention Registration [19]

[11] Reg. Number: H1,882

Asthana et al.

[45] Published: Oct. 3, 2000

[54] SYSTEM AND METHOD FOR TRANSFERRING DATA TO REDUNDANT COMPONENTS

[76] Inventors: Sarvesh Asthana, 1871 Wall St., Apartment 8, Memphis, Tenn. 38134; H. John Lohn, III, 957 Tara Woods Dr., Collierville, Tenn. 38017

[21] Appl. No.: 09/025,872

[22] Filed: Feb. 19, 1998

Related U.S. Application Data

[60] Provisional application No. 60/060,107, Sep. 26, 1997.

[51] Int. Cl.[7] ..... H04J 3/06

[52] U.S. Cl. ..... 370/503

[56] References Cited

U.S. PATENT DOCUMENTS

| | | | |
|---|---|---|---|
| 5,487,101 | 1/1996 | Fletcher | 379/60 |
| 5,521,961 | 5/1996 | Fletcher et al. | 379/59 |
| 5,623,532 | 4/1997 | Houde et al. | 379/58 |
| 5,627,681 | 5/1997 | Fletcher | 379/60 |

OTHER PUBLICATIONS

Steve Chen, "*Hybrid MicroSystems: The Ultimate Flexbility in Cellular Applications*", 1996, pp. 1–16, Celcore, Inc., Memphis, Tennessee.

"*GlobalHub Mobility Manager—Enables "One Number" PCS Service Via Motorola PPS Residential Products*" pp. 1–2, Celcore, Inc., Memphis, Tennessee, 1996.

"*IS–41 Network Hub—The Mobility Manager for Celcore's GlobalSystem*" pp. 1–2, Celcore, Inc., Memphis, Tennessee, 1996.

"*GlobalHub*" pp. 1–10, Celcore, Inc,. Memphis, Tennessee, 1996.

John Scourias, "*Overview of the Global System for Mobile Communications*", Mar. 27, 1996, pp. 1–16, John Scourias.

Martin A. Iroff & Steve Chen, "A distributed GSM Architecture for Low–Traffic Density Markets", *Mobile Communications International*, Oct. 1996, pp. 1–3, IBC Business Publishing, London, England.

Information pamphlet, Feb. 1997, pp. 1–7, Version 1.0, Celcore, Inc., Memphis, Tennessee.

"*BS–20/BS–21, D900/D1800 Base*Transceiver Station ", pp. 1–2, Geschaftszweig Mobilfunknetze, Munchen, Germany, 1997.

"*Unique Solutions to Complex Challenges of Wireless Carriers*" pp. 1–9, Celcore, Inc., Memphis, Tennessee, 1997.

Michel Mouly and Marie–Bernadette Pautet "*The GSM System for Mobile Communications*", 1992, pp. 79–122, pp. 261–646, Cell & Sys, France.

Lawrence Harte, Stever Prokup, and Richard Levine "*Cellular and PCS, The Big Picture*", 1997, pp. 61–181, McGrawn–Hill, United States of America.

George Lamb "*GSM made SIMple*", pp. 3–158, Regal Printing, United States of America.

*Primary Examiner*—Daniel T. Pihulic

[57] ABSTRACT

A system, and associated methods, for transferring data to redundant components of a telecommunications system is provided. The system includes a synchronization client operating on a component. The system also includes a synchronization server operating on another component. The synchronization client is operable to transfer predetermined data to the synchronization server upon the occurrence of a predetermined condition.

25 Claims, 6 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

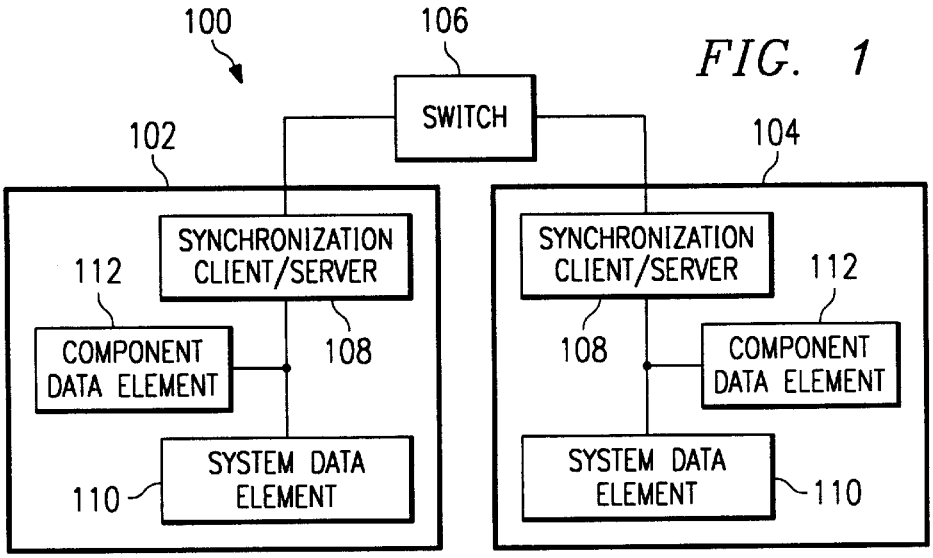
FIG. 1
FIG. 3
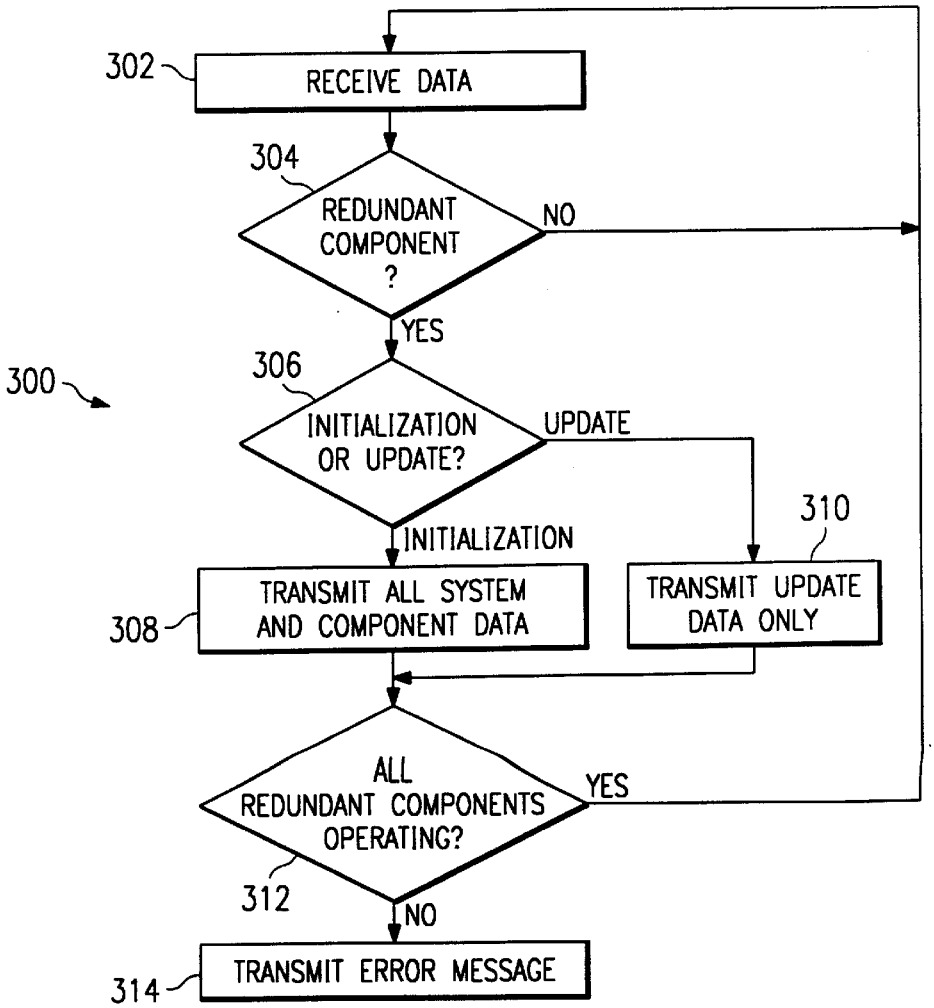

500

516
CALL PROCESSOR ASSEMBLY
NETWORK MANAGEMENT SYSTEM
518
CLIENT
SERVER
528
530
ETHERNET HUB
534
502
RESOURCE ASSEMBLY
524
SWITCHING MODULE
522
LINK ACCESS PROTOCOL ON THE D-CHANNEL SYSTEM
SWITCH
526
CONFIGURATION MANAGEMENT SYSTEM
510
514
HIGH SPEED BUS
CONTROL BUS
504
512
506
508
520
DSP
DSP
520
INTERFACE MODULE
TELEPHONY SUPPORT MODULE
SIGNAL PROCESSING MODULE

SYSTEM AND METHOD FOR TRANSFERRING DATA TO REDUNDANT COMPONENTS

CLAIM OF PRIORITY

The instant patent application claims priority from the U.S. provisional patent application designated with Ser. No. 60/060,107, entitled "Cellular Communication System," naming Anthony G. Fletcher and Scott D. Hoffpauir as inventors, and which was filed on Sep. 26, 1997.

RELATED PATENT APPLICATIONS

The instant patent application is related to the following patent applications: (a) U.S. patent application No. 09/025,870, "Integrated Telecommunications System," DSC Case No. 834-00, attorney docket no. 24194000.180, naming Scott D. Hoffpauir and Anthony G. Fletcher as inventors, commonly owned and assigned with the present application and filed contemporaneously with this application; and (b) U.S. patent application No. 08/678,254, now U.S. Pat. No. 5,835,486, "Multi-Channel Transcoder Rate Adapter Having Low Delay and Integral Echo Cancellation," naming James M. Davis and James D. Pruett as inventors, filed Jul. 11, 1996, commonly owned and assigned with the present application.

FIELD OF THE INVENTION

The present invention relates generally to telecommunications systems, and more particularly to the transfer of data to redundant components that allows redundant components to maintain system operation in the event of primary component failure.

BACKGROUND

Telecommunications systems are used to provide telecommunications services between two or more user interfaces. User interfaces may include telephone handsets, facsimile machines, computers, and other equipment, and may be connected to the switching system by fixed land-based conductors or wireless services. Telecommunications services are provided by establishing a telecommunications channel between two user interfaces, such that encoded analog or digital data may be transmitted between the user interfaces until a state of completion is reached.

Switching system reliability is an important feature of a switching system. When a switching system component fails, the switching system may be rendered unavailable for a prolonged period of time. To improve switching system reliability, redundant components may be used to provide for timely recovery of switching system function in the event of a component failure. Although redundant switching system components can improve switching system reliability, the failure of a redundant component can result in the interruption of established telecommunications channels. Furthermore, the switching system may remain unavailable for a brief period of time after the switch to the backup component is completed, as the backup component is configured for operation. Thus, although switching system reliability may be improved by the use of redundant components, the switchover to the redundant component is not transparent.

SUMMARY OF THE INVENTION

Therefore, a need has arisen for a system and method for transferring data to redundant components that reduces or eliminates the interruption of service for established telecommunications channels that can accompany the failure of a primary component.

In accordance with the present invention, a system and method for transferring data to redundant components are provided that substantially eliminate or reduce disadvantages and problems associated with previously developed systems and methods for managing redundant components.

One aspect of the present invention is a system for transferring data to redundant components of a telecommunications system, which includes a synchronization client operating on a component. The system also includes a synchronization server operating on another component. The synchronization client is operable to transfer predetermined data to the synchronization server.

Another aspect of the present invention is a method for transferring data to redundant components of a telecommunications system. The method includes receiving data at a system. Predetermined data is then transmitted from the system using a synchronization client system. The predetermined data is then received at another system using a synchronization server.

Yet another aspect of the present invention is a method for transferring data to redundant components of a telecommunications system. The method includes activating a component, and activating a synchronization client of the component if a redundant component has not been activated. A synchronization server of the component is activated if a redundant component has been activated.

Yet another aspect of the present invention is a method for transferring data to redundant components. The method includes adding a redundant component to a system that has an operating component. Synchronization data is then transmitted to the redundant component from the operating component without interrupting the operation of the first component.

Yet another aspect of the present invention is a method for transferring data to redundant components. The method includes transmitting activation status data between redundant components. An activation status flag is changed for a predetermined component when the activation status data is not received.

The present invention provides many important technical advantages. One important technical advantage of the present invention is a system for transferring data to redundant components of a telecommunications system that uses a client/server structure. The client/server structure of the system of the present invention allows any of the redundant components to be the primary component and any of the remaining redundant components to be the standby components, such that the standby components can maintain the state of established telecommunications channels upon failure of the primary component.

Another important technical advantage of the present invention is a method for transferring data to redundant components of a telecommunications system that allows standby components to be installed while the telecommunications system is in operation. The method of the present invention provides for a complete set of synchronization data to be provided to standby components after they are installed while providing update data to existing standby components.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which:

FIG. 1 is a block diagram of a synchronization system in accordance with one embodiment of the present invention;

FIG. 3 is a flow chart of a method for compiling synchronization data in accordance with the embodiment of the present invention;

DETAILED DESCRIPTION OF THE DRAWINGS

Figure 2:
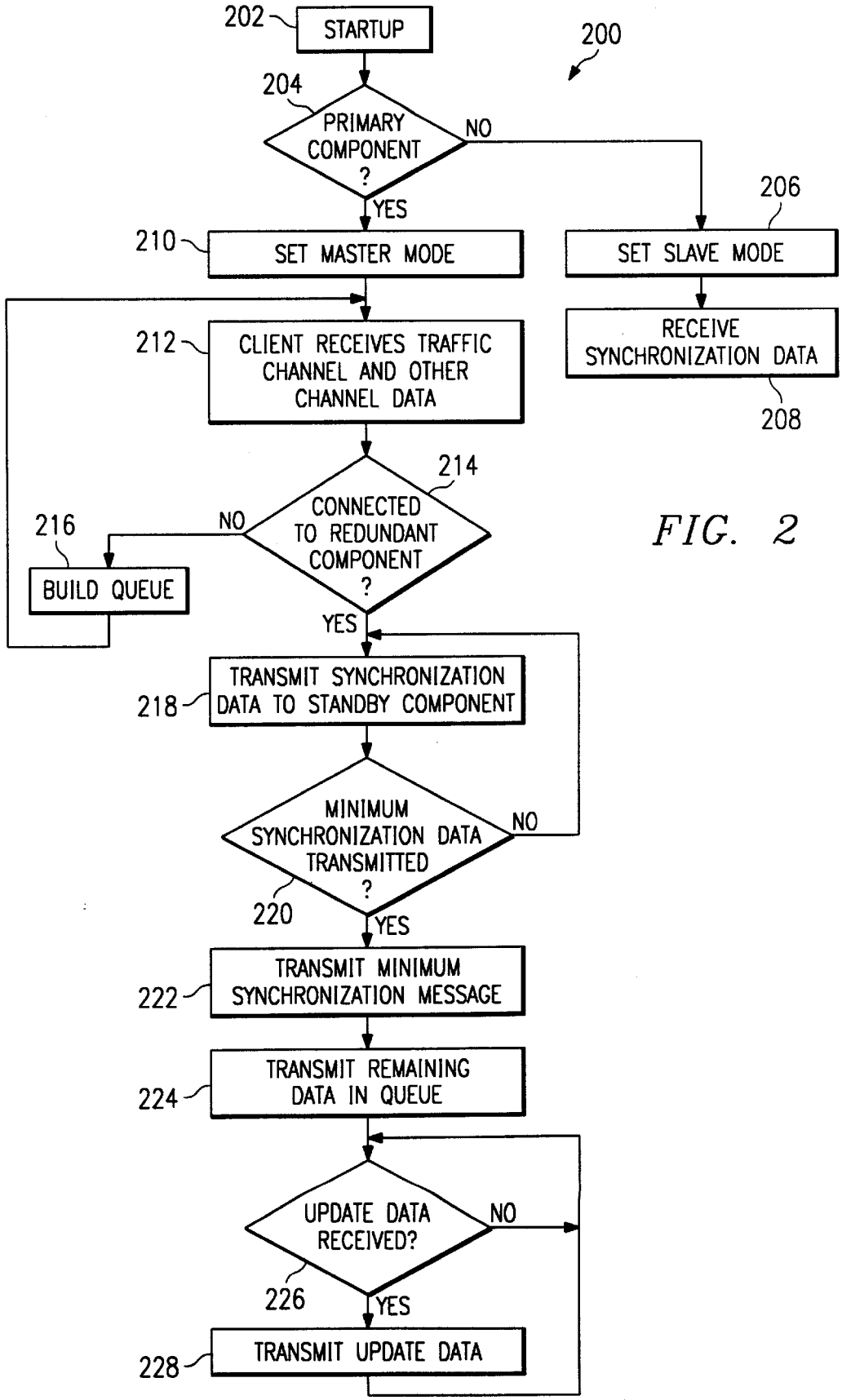
FIG. 2 is a flow chart of a method for synchronizing redundant components in accordance with one embodiment of the present invention.

FIG. 1 is a block diagram of a synchronization system 100 in accordance with one embodiment of the present invention. Synchronization system 100 may be used to maintain data on redundant components of a telecommunications system and to allow the standby component to assume operations when the primary component fails. An exemplary telecommunications systems in which synchronization system 100 may be used is provided by the patent application Ser. No. 09/025,870 entitled "Integrated Telecommunications System," DSC Case No. 834-00, attorney docket no. 24194000.180, naming Scott D. Hoffpauir and Anthony G. Fletcher as inventors, commonly owned and assigned with the present application, filed contemporaneously with this application, and which is hereby incorporated by reference for all purposes.

Synchronization system 100 includes a primary module 102 and a standby module 104, which may be redundant components or components that otherwise perform the same or similar functions in a telecommunications system using the same or similar data. At startup, one of the modules, such as module 102, will operate as the primary module. The remaining modules, such as module 104, will operate as standby modules. For example, the primary module may be the module that obtains control of a predetermined resource or resources, such as a control bus, a signaling bus, a data bus or other suitable system resource(s).

The primary module 102 and standby module 104 are each coupled to a switch 106. Switch 106 is used to transfer synchronization data and other data between the primary module 102 and standby module 104. Switch 106 is preferably a suitable data transfer device, including but not limited to an Ethernet hub, a data bus or a packet switch. Primary module 102 and standby module 104 each include a synchronization client/server element 108. Synchronization client/server element 108 may be implemented in software, hardware or a suitable combination of hardware and software.

Synchronization client/server element 108 may be configured to operate as a synchronization server with respect to a standby module 104, and to operate as a synchronization client with respect to a primary module 102. Alternativley, synchronization client/server element 108 may be configured to operate as a synchronization client with respect to a standby module 104, and to operate as a synchronization server with respect to a primary module 102. In this manner, the first of two or more redundant components to take control of the predetermined resource(s) operates synchronization client/server element 108 as either a synchronization client or synchronization server, and the remaining module(s) operate synchronization client/server element 108 as a synchronization server or synchronization client, respectively. Either configuration is acceptable as long as the primary module 102 is operating in the client/server counterpart to secondary module(s) 104. Likewise, synchronization client/server element 108 may also be implemented as two separate systems that perform a function similar to a single synchronization client/server element 108.

Synchronization client/server element 108 is coupled to one or more system data elements 110. System data elements 110 may be implemented in software, hardware or a suitable combination of software and hardware. In addition, synchronization client/server element 108 is coupled to one or more component data elements 112. Component data elements 112 may likewise be implemented in hardware, software, or a suitable combination of hardware and software.

A system data element 110 is operable to receive and store data pertaining to the system configuration and system operational state of the system in which the module is operating. A component data element 112 is operable to retrieve data pertaining to the module configuration and module operational state. For example, a system data element 110 may be operating on a module in a telecommunications system that includes system configuration and operational state data that may need to be transferred to one or more backup modules so as to enable the backup module (s) to maintain the status of existing telecommunications channels in the event of failure of the primary module. The system data element 110 may receive or controllably retrieve configuration and operational state data from components the telecommunications system in which the primary module is operating. Likewise, the component data element 112 may be operating on a module in a telecommunications system that includes switch state data and signaling data that may need to be transferred to any backup module(s) so as to enable the backup module(s) to maintain the status of existing telecommunications channels in the event of failure of the primary module. The system data element 110 may receive or controllably retrieve switch state data and signaling data from components of the module, such as a processor, a random access memory, a flash memory module, a field programmable gate array, a programmable read-only memory module, a Link Access Protocol on the D Channel handler or other components of the module.

A synchronization client/server element 108 operating in client mode receives data from the system data element 110 and the component data element(s) 112 and compiles the data into one or more synchronization messages. The synchronization message(s) are then transmitted over switch 106 to the synchronization client/server element 108 operating on standby module 104. A synchronization client/server element 108 may be configured to perform the generation of the synchronization message(s) after the system data element 110 transmits a suitable message that indicates that the system has reached an allowable state for operation, such as a "SYNC_CLIENT_START" message. Upon receiving this message, the synchronization client/server element 108 operating in client mode initiates a client connection and forwards predetermined data from the system data element 110 and the component data element(s) 112 to the synchronization client/server element 108 operating in server mode on the standby module 104.

Data pertaining to the present state of the system and module is also stored. If a standby module 104 is subsequently installed, the standby module 104 transmits a suitable message, such as a "SYNC_REQ" message, to the synchronization client/server element 108 of the primary module 102, to synchronize the system data element 110 and the component data element 112 of the primary module 102 with the corresponding systems of the standby module 104.

Synchronization client/server element 108 operating on standby module 104 operates in the server processing mode, and receives the synchronization message(s) coming from synchronization client/server element 108 running on the primary module 102. For example, the presence of an operational synchronization client/server system 110 on a standby module 104 may be indicated by the transmission a suitable message, such as a "START_SERVER_REQ" message, to a call processor system. The call processor system may then transmits a response message that causes the standby module 104 to operate synchronization client/server element 108 in server mode. The synchronization message(s) then received from the synchronization client/server system of primary module 102 are then transferred to the appropriate data element, such as system data element 110 or component data element 112.

In operation, the system data element 110 and component data element 112 of the primary module 102 receive system configuration data, system operational state data, component configuration data and component operational data. The synchronization client/server element 108 operating in client mode on the primary module 102 initiates a synchronization process with the synchronization client/server element 108 operating in server mode on the standby module(s) 104. Synchronization client/server element 108 of the standby module(s) 104 receives the system and component data from the synchronization client/server element 108 of the primary module 102.

In this manner, a complete set of system and component data is received by the primary module 102 and is transferred to the standby module(s) 104 at startup. The standby module(s) 104 is operable to maintain operations in the event of failure of the primary module 102.

FIG. 2 is a flow chart of a method 200 for synchronizing redundant components in accordance with one embodiment of the present invention. Method 200 may be used in conjunction with a synchronization client/server element 108 to allow redundant backup components to obtain required data to maintain system operation when a primary component failure occurs. Method 200 may be used where the master component is the client and the slave component (s) is the server, where the master component is the server and the slave component(s) is the client, or in other suitable configurations.

Method 200 starts at step 202, where the component undergoes startup procedures. For example, the component may be a module that is installed into a slot location of an equipment rack of a telecommunications system. Upon receiving power, the component downloads operational code data, including a synchronization client/server system, and performs suitable startup procedures.

At step 204 it is determined whether the component is the primary/master component. For example, a component may be designated as the primary component if it obtains control of one or more buses, such as a control bus (for example, a High Level Data Link Controller bus) and/or a data bus (for example, a pulse code modulation bus). If the component is not the primary resource module, the method proceeds to step 206. At step 206, slave mode for the synchronization client/server element is set. For example, slave mode may be the server mode in a system configuration having a single primary component and a single backup component. Alternatively, slave mode may be the client mode in a system configuration having a single primary component and one or more backup components.

When a synchronization client/server element 108 is operating in slave mode, it will operate in a standby configuration until it receives synchronization data. At step 208, a synchronization client/server element 108 receives synchronization data. For example, the synchronization data may include system data and component data.

If the component is determined to be the primary component at step 204, the method proceeds to step 210. At step 210, the client/server synchronization element 108 of the primary component is set to master mode. The method then proceeds to step 212, where that synchronization client/server element 108 receives system and component data. Alternatively, other suitable systems of the primary component may request or receive data in coordination with the synchronization client/server element 108. For example, a request for system and component data and/or signaling data may be transmitted to a call processor of a telecommunications system.

At step 214, it is determined whether a connection has been established to a synchronization client/server element 108 of a redundant component. For example, if the primary component is operating in master mode as a synchronization client element, then a message may need to be received at step 214 from an external controller that indicates the presence a redundant component operating in slave mode as a synchronization server element. Alternatively, if the primary component is operating in master mode as a synchronization server element, then a message may need to be received at step 214 from a redundant component operating in slave mode as a synchronization client. Other suitable configurations may also be used.

If a connection has not been established with a redundant component at step 214, the method proceeds to step 216 where a queue of synchronization data is compiled. The queue may include two or more different queues, where one of the queues contains data that is required to allow the redundant component to achieve a minimum operational level, and the other queue or queues contain additional data that may be used for synchronization purposes after the redundant component has achieved the minimum operational level. The method then returns to step 212.

If a connection has been established with a redundant component at step 214, the method proceeds to step 218 where synchronization data is transmitted to the standby component. The method then proceeds to step 220, where it is determined whether minimum synchronization data has been transmitted to the redundant component. For example, the synchronization data may include data from a synchronization data queue that is required to enable the backup component to operate upon failure of the primary component. If the minimum synchronization data has not been transmitted, then the backup component will need to be configured from an automatic startup configuration instead of from a synchronization configuration. If minimum synchronization data has not been transmitted, the method returns to step 218. Otherwise, the method proceeds to step 222.

At step 222, a minimum synchronization message is transmitted to the redundant component. The redundant component may be configured to reset upon loss of the primary component if the loss of the primary component occurs prior to receipt of the minimum synchronization message. The method then proceeds to step 224, where any remaining data stored in the queue is transmitted to the redundant component. The method then proceeds to step 226.

At step 226, it is determined whether update data has been received at the primary component. Update data includes data that has changed since the last time data was transmitted to the redundant comnponent. If no update data has been received at the primary component, the method returns to step 226. If update has been received at the primary component, the method proceeds to step 228, where the update data is transmitted to the redundant component. The method then returns to step 226.

FIG. 3 is a flow chart of a method 300 for transmitting data to one or more redundant standby components in accordance with one embodiment of the present invention. Method 300 may be used to initially configure or update the data for one or more redundant standby components from a primary component. For example, the primary and standby components may be switching modules and resource modules of a telecommunications system.

At step 302, the primary component operating in a master mode receives system and component data that may be required for the primary component to operate. The method then proceeds to step 304, where it is determined whether a redundant component operating in slave mode is present. For example, the primary component may operate a synchronization client system and the redundant component may operate a synchronization server system, in which case it may be necessary for an external controller to transmit a message to the primary component to identify that a redundant component is present. Alternatively, the primary component may operate a synchronization server system and the redundant component may operate a synchronization client system, such that the presence of the redundant component may be established at the primary component by receipt of a connection message.

At step 306, it is determined whether the redundant component requires initialization data or update data. If the redundant component has not been initialized, it requires all of the component data and system data to assume primary component status upon failure of the primary component, the method proceeds to step 308 where all of the component data and system data is transmitted. If the redundant component has already been initialized, then the only data that is transmitted is that system data and component data that has changed since the last update was transmitted. After steps 308 and 310, the method proceeds to step 312.

At step 312, it is determined whether all operating standby components have been updated. If the primary component is operating a synchronization server system and the redundant component(s) operate a synchronization client system, then a loss of connection with the redundant components will be detected by the synchronization server system. Alternatively, if the primary component operates a synchronization client system and the redundant component operates a synchronization server system, the failure of the redundant component to be updated may be determined by an external controller for the redundant component.

If all standby components have been updated, the method returns to step 302 to await further update data. If all standby components have not been updated, the method proceeds to step 316 where an error message is generated. This error message may indicate that the standby component is unavailable, has failed in service, has been removed from service, or that other problems may have occurred.

Figure 4:
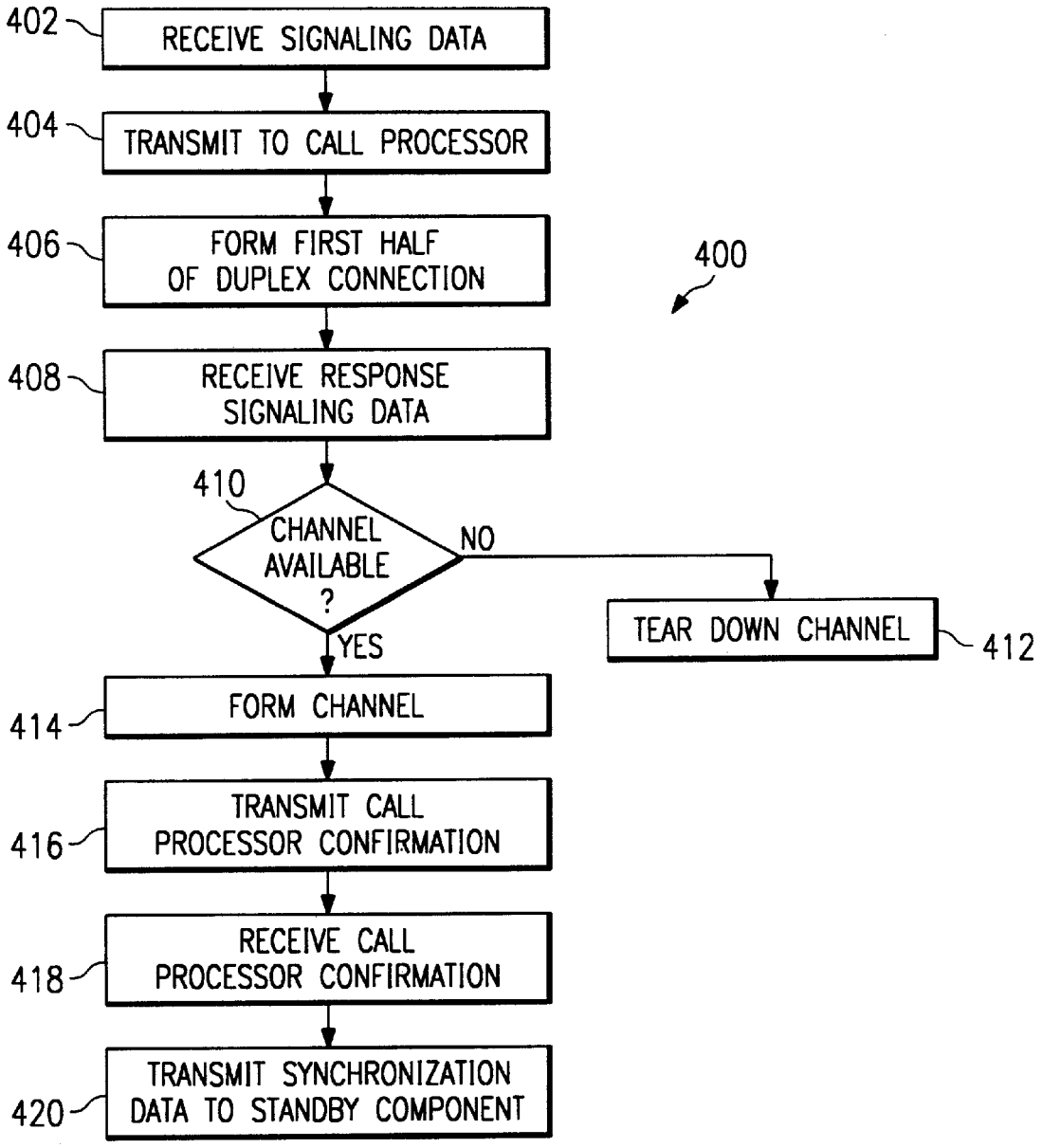
FIG. 4 is a flow chart of a method for compiling synchronization data in accordance with one embodiment of the present invention.

FIG. 4 is a flow chart of a method 400 for compiling synchronization data in accordance with one embodiment of the present invention. Method 400 may be used in an update mode following completion of an initial synchronization method, such as that shown in FIG. 2.

Method 400 starts at step 402, where signaling data is received at a telecommunications system. This signaling data may be received in an in-band or an out-of-band format, and may be processed by resource modules of the telecommunications system. At step 404, the signaling data is transmitted to a call processor system of the telecommunications switch. The call processor system is operable to process the signaling data to determine the call origination, call destination and other necessary call data. The method then proceeds to step 406, where the first half of a duplex connection is formed. A duplex connection refers to a telecommunications channel that includes a sending channel and a receiving channel. Telecommunications channel set-up procedures typically include configuring the first half of the duplex connection when a call initiation is attempted, followed by a second half of a duplex connection when the receiving end of the telecommunications channel has established availability.

At step 408, response signaling data is received. This response signaling data may include such signaling data as a busy signal, a no answer signal or an off-hook signal indicating that a caller has answered the call. After receiving the response signaling data, the method proceeds to step 410.

At step 410, it is determined whether a channel is available. For example, if the response signaling data is a busy signal, channel availability would not exist and the method would proceed to step 412. At step 412, the first half of the duplex connection formed at step 406 is torn down. For example, a signaling message may be sent from the telecommunications system to an originating telecommunication system indicating that the called party is unavailable. In this manner, telecommunications resources may be quickly deallocated so that they may be made available for subsequent calls.

If it is determined that a channel is available at step 410, such as by an off-hook signal being received from the called party, the method proceeds to step 414. At step 414, a channel is formed. For example, response data indicating that the called party has taken the receiver off-hook is transmitted to the call originating switch. If the calling party has not terminated the call, a channel link may be established, and data may be set to indicate that the channel has progressed from a call initiation to a call execution stage.

At step 416, the channel data is transmitted to a controller. For example, resource modules of a telecommunications switch may be processing the signaling data during the call set-up procedures. After the call has proceeded to a "call-in-progress" stage, the resource modules may transmit channel data to a call processor of the telecommunications system. The method then proceeds to step 418, where resource modules receive call processor confirmation of the telecommunications channel. For example, call processor confirmation may be used to monitor telecommunications resources and prevent inadvertent allocation of telecommunications resources, such as time slot switching channels, when they are not being used for telecommunications purposes.

Figure 5:
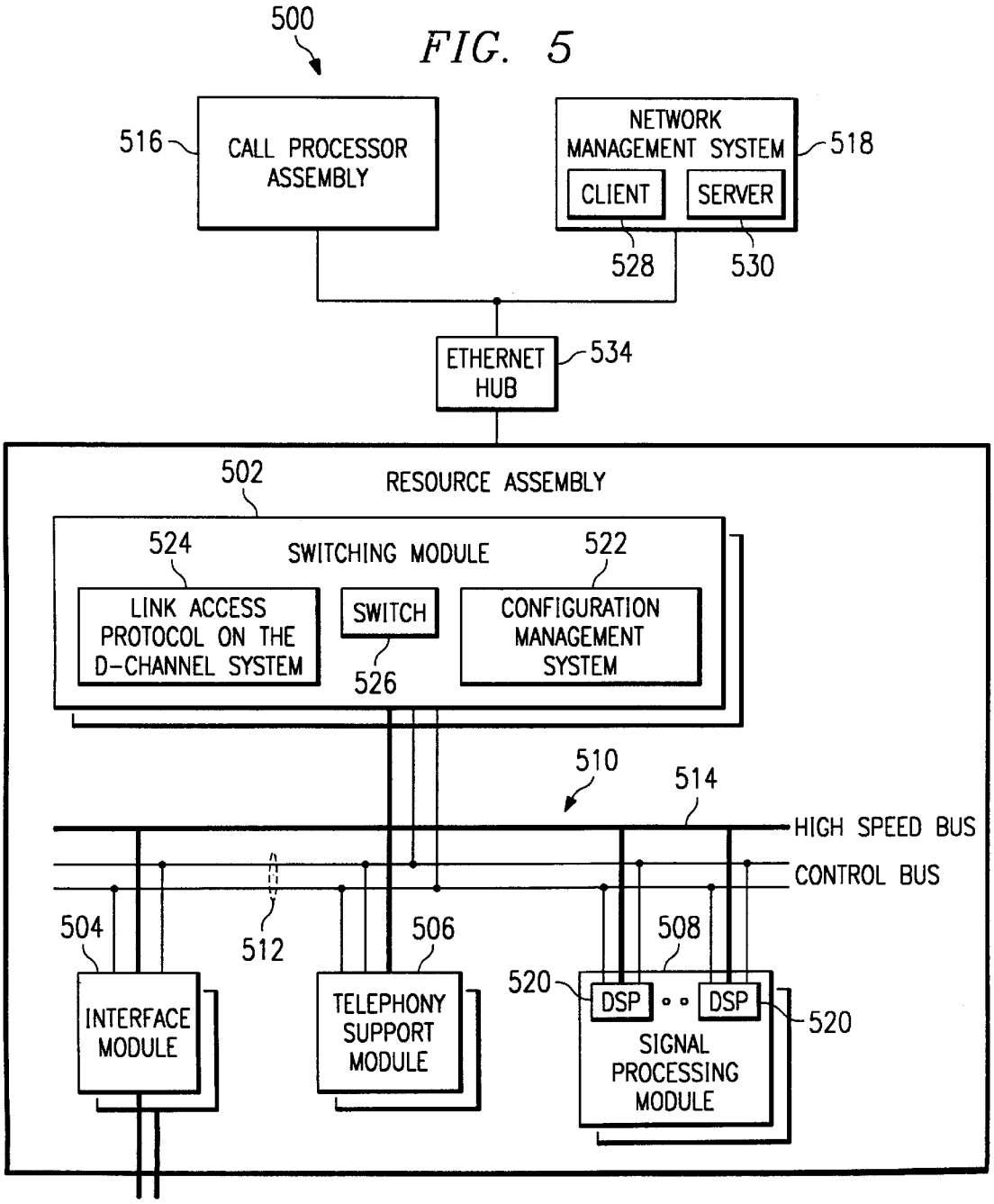
FIG. 5 illustrates various modules of a resource assembly of a telecommunications system in accordance with an exemplary embodiment of the present invention.
Figure 6:
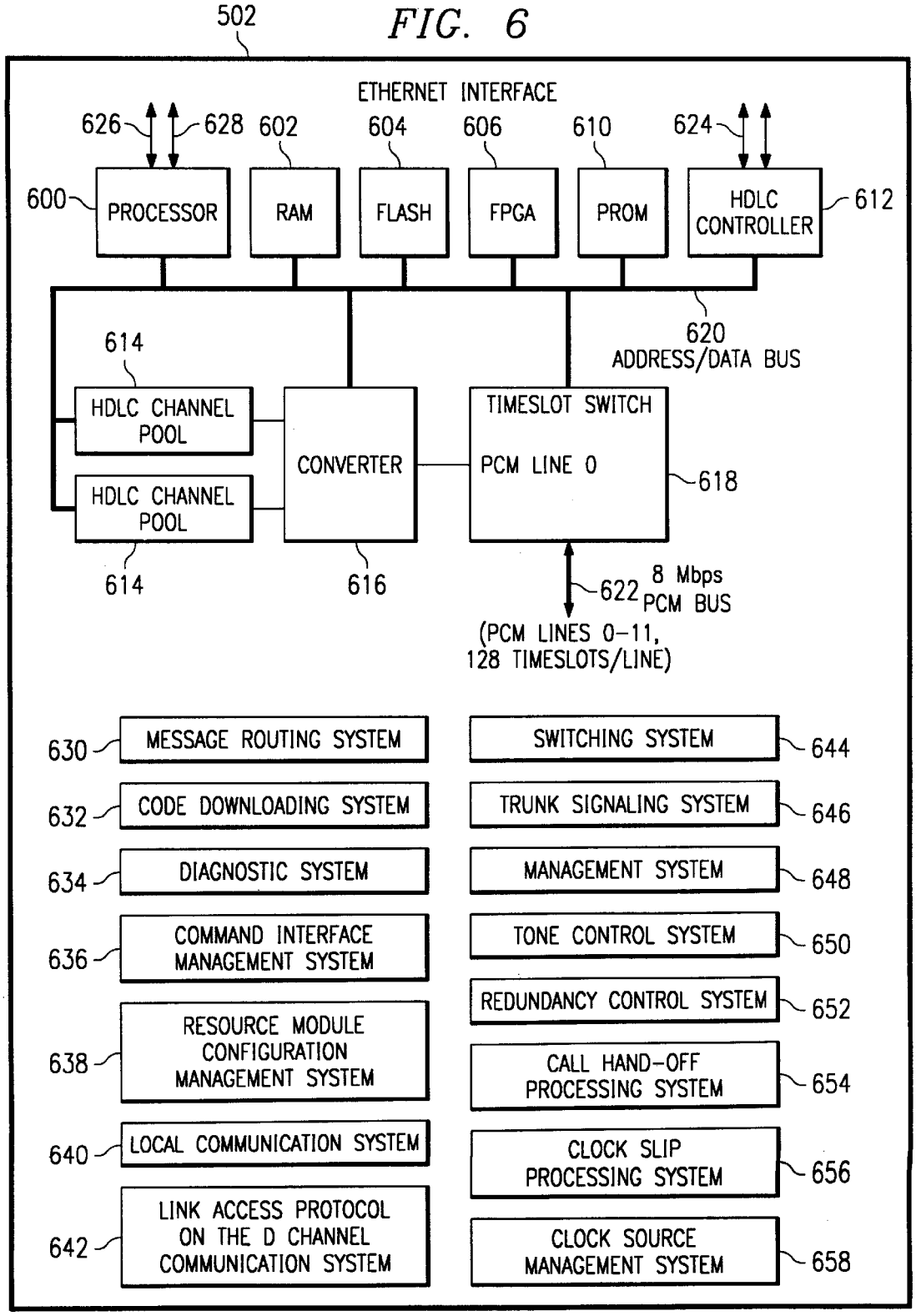
FIG. 6 is a block diagram of a switching module in accordance with one embodiment of the present invention.
Figure 7:
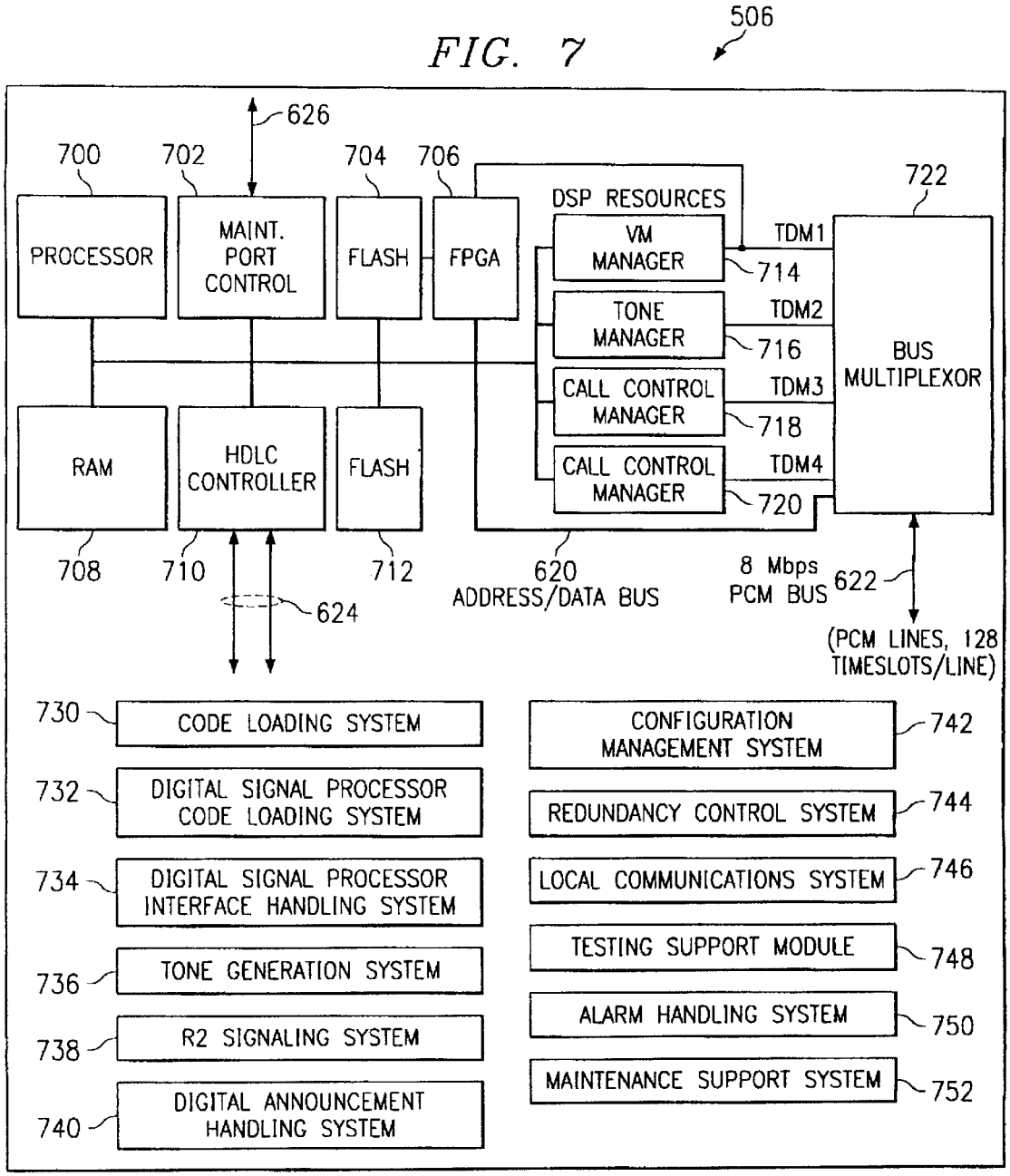
FIG. 7 is a block diagram of a telephony support module in accordance with one embodiment of the present invention.

The method then proceeds to step 420, where synchronization data is transmitted to the standby switching modules. For example, if a standby switching module has already received initial system configuration data, the synchronization data may include an update message that includes new confirmed telecommunications channel data, such as a telecommunications switch input and output time slot. As set forth above, the present invention is able to transfer data to redundant components, thereby reducing or eliminating the interruption of service for redundant components of a telecommunications system. It should therefore be appreciated that the present invention can be advantageously employed with respect to numerous diverse components of a telecommunications system. FIGS. 5–7 illustrate a particular environment in which the present invention may be applied. However, it should be appreciated that such environment and application is exemplary, and should not be viewed as a limitation on the scope of the present invention.

FIG. 5 illustrates various modules of a resource assembly 500 of a telecommunications system that is consistent with the Groupe Speciale Mobile standard for a Global System for Mobile Communications (GSM) and in accordance with an exemplary embodiment of the present invention. In accordance with an exemplary embodiment, one or more switching modules 502, interface modules 504, telephony support modules 506 and signal processing modules 508 are provided within a resource module assembly 510. The interface modules 504, signal processing modules 508, and telephony support modules 506 are coupled through one or more of the switching modules 502. Control information is provided by a switching module 502 to other modules over the redundant control bus 512. Data is provided by a switching module 502 to other modules over a high speed bus 514.

A switching module 502 may be implemented in software, hardware or a suitable combination of software and hardware. A switching module 502 preferably performs switching operations, clock operations, and local communications between resources of the resource module assembly 510 of the telecommunications system. These operations may be performed using pulse code modulation switching and data transfer techniques, Link Access Protocol on the D Channel (LAP-D) communications and Ethernet interface communications.

A switching system 526 preferably resides within a switching module 502 to perform the switching functions and operations. That switching system 526 may be a timeslot switch having a memory timeslot matrix to make required timeslot cross-connections within the telecommunications system. The switching system 526 functions to set up and tear down both simplex and duplex connections between two specified channels, which may represent a call or other useful connections. For example, the switching system 526 may cause a channel to connect a channel (provided by, for example, a base transceiver station or a switched network) to a call progress tone or a voice announcement. Further, the switching system 526 should be operable to set up system defined connections upon power up and reset as well as connections for the testing of timeslots when not in use. Timeslots are preferably provided to the timeslot switch via the high speed bus 514.

A switching module 502 may also, for example, include suitable digital data processing devices, a processor, random access memory and other devices. Preferably, each switching module 502 runs a suitable operating system, and include one or more pulse code modulation bus interfaces, one or more High Level Data Link Controller (HDLC) control bus interfaces, one or more Ethernet interfaces, and an arbitration bus interface to other switching modules 502.

Switching module 502 may also include a synchronization client/server element 108, a system data element 110, and a component data element 112. One or more redundant switching module(s) 502 may also be present in resource module assembly 510. In particular, the system data element 110 of a switching module 502 is operable to receive or request data from a configuration management system 522 of switching module 502, which performs resource module assembly 510 configuration management functions. All configuration-related aspects of the resource module assembly 510 are controlled by the configuration management system 522, including but not limited to identification and tracking of active resource modules, control of resource module identifiers and addresses, maintenance of resource module configuration data, management of hardware failovers, installation and removal of components during operation, and other functions. The initial interface description data is received by the configuration management system from call processor assembly 516, and is used to generate the necessary commands and tables for the connections needed by signal processing module(s) 508, interface module(s) 504, and telephony support module(s) 506.

The component data element 112 of a switching module 502 is operable to receive or request data from a link access protocol on the D channel system 524 and a switching system 526 of switching module 502. The link access protocol on the D channel system 526 of switching module 502 maintains resource module assembly 510 configuration data, manages hardware failovers, and processes installation and removal of components while the telecommunications system is in operation. The switching system 526 of switching module 502 makes all required connections for switching module 502. These include connections for actual telephone calls (such as duplex connections or conference calls), connections upon power up or reset, connections for trunk signaling, connections for built-in diagnostic tests and fault isolation tests, and connections for tone and announcement playback.

A telephony support module 506 may be implemented in software, hardware or a suitable combination of software and hardware. A telephony support module 506 may, for example, provide tone generation, R2 digit transceiver functions, and digitized announcement generation for the telecommunications system. Telephony support modules 506 may also provide call setup functions, such as digit collection and out-pulsing, and call completion functions, such as digitized announcement generation and call supervisory tone generation. A telephony support module 506 may, for example, include suitable telecommunications data processing equipment, such as a processor, random access memory, one or more redundant High Level Data Link Controller bus interfaces, one or more pulse code modulation buses, and an arbitration bus for establishing active telephony support module 506 status. Preferably, a single telephony support module 506 provides all required functionality for the telecommunications system, and one or more additional telephony support modules 506 are used to provide redundancy in the event of component failure.

The telephony support module 506 may also include a synchronization client/server element 108, a system data element 110, and a component data element 112. One or more redundant telephony support module(s) 506 may also be present in resource module assembly 510.

An interface module 504 is an interface device that is used to interface a suitable number of telecommunications lines that carry data in a predetermined format, such as an E1 data format, with the telecommunications system 504. Interface modules 504 provide the physical interface between the telecommunications system and other equipment, a switched network, and base transceiver stations. Interface modules 504 also support in-band trunk signaling for DSO data channels that are configured for channel associated signaling, and transmit data to and receive data from a signal processing module 508. An interface module 504 may be implemented in software, hardware or a suitable combination of software and hardware. For example, an interface module 504 may include suitable data processing equipment, such as a processor, random access memory, up to four E1 ports, redundant High Level Data Link Controller bus interfaces, and pulse code modulation bus interfaces.

A signal processing module 508 is preferably used to provide an interface between a call processor assembly 516 and a signaling system. For example, signaling data may be received from a data transmission channel from the switched network, and may be switched to another data transmission channel, such as an E1 telecommunications channel, from an interface module 504 to a signal processing module 508 by a switching module 502. A signal processing module 508 is also preferably employed to perform transcoding and rate adaption functions, such as converting from a wireless system speech encoding format to a pulse code modulation data format, as well as other functions, such as echo cancellation functions. For example, signal processing modules 508 may be employed by telecommunications system to convert data from the GSM data format to another format, such as the pulse code modulation data format.

One or more digital signal processors (abbreviated DSP) 520 are preferably provided within the signal processing module 508. A multi-channel transcoder rate adapter unit is preferably implemented in a digital signal processor 520. That is, one or more digital signal processors 520 preferably incorporate functions associated with the transcoder rate adapter unit 520. Such digital signal processors 520 preferably include multiple input and output buffers for storing multiple channel audio data, and perform rate adaption through an interrupt-driven routine that places the appropriate channel data onto both the near-end and far-end transmission lines at the appropriate data rate. With the implementation of rate adaption, such digital signal processors 520 also have further processing power available to perform encoding and decoding of the incoming audio data. In addition to functions associated with the transcoder rate adapter, an echo-cancellation capability may be advantageously provided by the digital signal processors 520 by utilizing the already robust voice activity detection bits produced in transcoding a signal. An example of a single digital signal processor 520 that provides transcoding, rate adaption, and echo-cancellation functions, and using an improved decoding process, is disclosed in U.S. patent application No. 08/678,254, now U.S. Pat. No. 5,835,486, "Multi-Channel Transcoder Rate Adapter Having Low Delay and Integral Echo Cancellation," naming James M. Davis and James D. Pruett as inventors, filed Jul. 11, 1996, commonly owned and assigned with the present application and which is hereby incorporated by reference for all purposes.

An E1 or T1 transmission line providing a 16,000 bits per second signal, which may carry four traffic channels, may be coupled to an interface module 504. That signal may, in turn, be connected to a digital signal processor 508 over a high speed bus 514. A digital signal processor 520 is further connected to a 64 kilobits per second transmission line also capable of carrying, for example, four traffic channels. The 64 kilobits per second transmission line can be, for example, a 64 kilobits per second PCM line. These lines are functionally bi-directional; each transmission line is connected to both an input and output of the digital signal processor 520. A digital signal processor 520 may be further connected via an address bus, a data bus, and a control bus to at least one random access memory and at least one read only memory device, in a conventional manner. A digital signal processor 520 used in this exemplary embodiment can be, for example, an Analog Devices 2106x digital signal processor chip.

A signal processing module 508 may be implemented in software, hardware or a suitable combination of software and hardware. In addition to one or more digital signal processors 520, a signal processing module 508 may include suitable data processing equipment, such as a processor, random access memory, four daughter board module ports, redundant High Level Data Link Controller bus interfaces, pulse code modulation matrix bus interfaces and other signal processing application hardware.

Call processor assembly 516 is coupled to network management system 518 and switching module 502 through Ethernet hub 534 or another suitable switch or connector. Call processor assembly 516 includes elements that are operable to process calls directed to, or received from, the subscriber units. The call processor assembly 516 is operable to handle call processing functions needed by the telecommunications system, including call origination, location updating, handovers between cells, trunking and call termination. The call processor assembly 516 may include a general purpose computing platform, such as an Intel Pentium II based computing platform, that includes suitable hardware and/or software systems to support call processing functions. The call processor assembly 516 may use a real-time operating system, such as a QNX™ operating system, to support the real-time call processing requirements of a telecommunications system.

Network management system 518 is coupled to call processor assembly 516 and switching module 502 through Ethernet hub 534. Network management system 518 is preferably separated into a client part and a server part, respectively referred to herein as the network management client 528 and the network management server 530. The network management client 528 provides a graphical user interface to an operator of the telecommunications system. The graphical user interface of the network management client 528 allows the operator to configure various settings, provide other information (including subscriber related information), monitor, operate, test and diagnose problems associated with the telecommunications system. The network management server 530 is operable to store and manage information provided to it by the network management client 528 and used by the call processor assembly 516 or the resource module assembly 510.

In operation, the configuration management system 522, switching system 526 and link access protocol on the D-channel system 524 of the primary switching module 502 receive configuration data, switch data and signaling data from call processor assembly 516 via Ethernet hub 534. When this data transfer is complete, a synchronization client/server element 108 operates in client mode for the primary switching module 502 and initiates a synchronization process with synchronization client/server element 108 of the standby switching module(s) 502 which operates in server mode. The synchronization client/server element 108 of the standby switching module(s) 502 receives the configuration system data, switch data and signaling data from the synchronization client/server element 108 of the primary switching module 502.

In this manner, a complete set of configuration system data, switch data and signaling data is received by the primary switching module 502 and is transferred to standby switching module(s) 502 at startup. Standby switching module(s) 502 is operable to maintain operations in the event of failure of primary switching module 502. After startup, synchronization client/server element 108 transmits configuration data, switch data, and signaling data after it has been processed by call processor assembly 516 to the synchronization client/server element 108. This data is only transmitted after the connections have been made externally by the call processor assembly 516. In this manner, connections that are in the process of being formed by the call processor are not transferred, because of the possibility of the change in state between the time of transfer and the time of potential fail-over.

Synchronization client/server element 108 may also be configured to operate on other resource module platforms, such as the telephony support module 506. For example, the synchronization client/server element 108 may couple to a configuration system and other suitable data systems that are operable to controllably retrieve data from a processor, a flash memory module, a field programmable gate array module, a random access memory module, a High Level Data Link Controller module, a flash memory module, and digital signal processor of the telephony support module 506 to support the transfer of calls that are in the process of being set-up or torn-down. This functionality will improve the ability of the telecommunications system to continue uninterrupted operations in the event of component failure.

FIG. 6 is a block diagram of a switching module 502 in accordance with one embodiment of the present invention. Switching module 502 is used to provide switching, clock functions, local communications, link access protocol on the D channel communications, and Ethernet connectivity for a telecommunications system.

Switching module 502 includes processor 600. Processor 600 may include, for example, a Motorola 68360 processor. Processor 600 controls the functions of switching module 502. Processor 600 has internal serial communications controllers that provide an Ethernet interface as well as an interface to the RS 232 maintenance port over a maintenance port interface 626. Processor 600 is coupled to address/data bus 620.

Switching module 502 also includes random access memory 602. Random access memory 602 provides memory storage location for code execution, data storage, and a system information and status register. The system information and status register stores data pertaining to the system configuration and operational status of the system components for telecommunications switch 12. Random access memory 602 is also coupled to address/data bus 620.

Switching module 502 also includes flash memory module 604. Flash memory module 604 is used to store software systems that control the operations of switching module 502. Flash memory module 502 stores a non-volatile copy of boot code (used for initiating operation of switching module 502), operational code, and field programmable gate array data. The boot block of flash memory module 604 is protected against inadvertent erasure by dual inline packet switches, such that when the dual inline packet switches are in the normal position, protected flash blocks cannot be written or erased. Field programmable gate array 606 provides logic to interconnect other functional blocks of switching module 502. For example, field programmable gate array 606 may be programmed to provide control logic for address/data bus 620. Field programmable gate array 606 is coupled to address/data bus 620.

Programmable read-only memory module 610 contains predetermined data such as the unique Ethernet media access control address, the Ser. No., the hardware run date, the revision number, and other suitable data for the switching module 502. Programmable read-only memory module 610 is coupled to address/data bus 620.

High Level Data Link Controller module 612 is a two port serial communications controller that provides communications over two redundant High Level Data Link Controller buses 624. High Level Data Link Controller module 612 supports the local communications function, which is a point to multi-point High Level Data Link Controller bus link between the switching module 502 and the resource modules. The High Level Data Link Controller buses 624 provide part of the communications path between the call processor assembly 516, the network management system 518, and the resource modules. Switching module 502 completes the path to the call processor assembly 516 and network management system 518 via an Ethernet interface 628.

Each High Level Data Link Controller channel pool 614 provides a total of 64 kilobits per second of High Level Data Link Controller data channels. High Level Data Link Controller channel pools 614 are coupled to a converter 616, which is operable to convert four- two megahertz data channel inputs into one eight megahertz data channel output. Converter 616 may be a Siemens MUSAC converter or other suitable converters. Converter 616 provides High Level Data Link Controller data channels of 64 kilobits per second each to accommodate Link Access Protocol on the D Channel communications with the base transceiver stations 16 over an Abis interface. Converter 616 is coupled to High Level Data Link Controller channel pools 614, address/data bus 620, and time slot switch 618. Each High Level Data Link Controller channel pool 614 is a multichannel network interface controller, such as a Siemens MUNICH 32 PEB 20320, or other suitable multichannel network interface controller.

Time slot switch 618 is a memory time slot matrix that is used to make all required time slot cross connections within the system. These connections include voice traffic channels, initial system definition connections upon power and reset, and connections needed for the testing of time slots when they are not in use. Data for switching is provided to the time slot switch 618 via the address/data bus 620.

Address/data bus 620 includes two or more serial conductors that are coupled to processor 600, random access memory 602, flash memory module 604, field programmable gate array 606, programmable read-only memory module 610, High Level Data Link Controller module 612, High Level Data Link Controller channel pools 614, converter 616 and time slot switch 618. The address/data buses 620 are used to transfer data between the components of switching module 502, and may be controlled by programmed instructions of field programmable gate array 606. Pulse code modulation bus 622 is an 8 megabit per second pulse code modulation data bus. Pulse code modulation bus 622 may include 16 serial pulse code modulation buses that each have 128 time slots per serial bus.

The software systems of switching module 502 include a message routing system 630, a code downloading system 632, a diagnostic system 634, a command interface management system 636, a resource module configuration management system 638, a local communication system 640, a link access protocol on the D channel communication system 642, a switching system 644, a trunk signaling system 646, a management system 648, a tone control system 650, a redundancy control system 652, a call hand-off processing system 654, a clock slip processing system 654, and a clock source management system 656. These systems may be implemented in software, hardware, or a suitable combination of software and hardware. For example, the software systems of switching module 502 may be programmed in C computer code, C++ computer code, or other suitable computer programming codes. The function of each system is described in greater detail below.

The message routing system 630 of switching module 502 provides a single point of communication between the resource module assembly 510 and the call processor assembly 516. Messages received from the call processor assembly 516 are routed to the proper destination within the resource module assembly 510 by the message routing system 630. These messages may be routed over the High Level Data Link Controller buses 624. The message routing system 630 also routes messages over a remote link access protocol on the D channel link to the base transceiver station(s). Messages from the resource module assembly 510 are routed to the resource manager by the switching module 502.

The code downloading system 632 of switching module 502 downloads code to flash memory module 604 for use by the software systems of switching module 502. Download messages are received from call processor assembly 516 which indicate the availability of boot block files, operational software files, or field programmable gate array data files. These files reside on a data storage device of call processor assembly 516. After receiving a download command, switching module 502 will download the code files or data files and store them in flash memory module 604. A confirmation message for the download is transmitted to call processor assembly 516 by switching module 502.

Switching module 502 also includes a diagnostic system 634. Built-in diagnostic tests ("BITs") are periodically executed by the diagnostic system 634 of switching module 502. The diagnostic system 634 of switching module 502 attempts to establish connections using available and untested time slots, such that all time slots are eventually tested. The diagnostic system 634 also supports performance of fault isolation tests ("FITs") that are used to further isolate a problem.

Switching module 502 also includes a command interface management system 636. The command interface management system 636 is used to support diagnostic and troubleshooting efforts by receiving user-entered commands and generating user-readable displays.

The configuration management system 638 of switching module 502 performs resource module assembly 510 configuration management functions. All configuration-related aspects of the resource module assembly 510 are controlled by the configuration management system 638, including but not limited to identification and tracking of active resource modules, control of resource module identifiers and addresses, maintenance of resource module configuration data, management of hardware failovers, installation and removal of components during operation, and other functions. The initial interface description data is received by the configuration management system 638 from call processor assembly 516, and is used to generate the necessary commands and tables for the connections needed by signal processing module 508, interface module 504, and telephony support module 506.

The local communications system 640 of switching module 502 is used to establish point to multi-point connectivity between the switching module 502 and processors located on individual resource modules. Communications are performed over the High Level Data Link Controller bus 624. The local communications system 640 of switching module 502 identifies processors of resource modules that are active and periodically polls unused resource module slots to determine if a module has been installed into the system.

The link access protocol on the D channel communication system 642 of switching module 502 manages call setup data, such as signaling, frequency allocation, and other suitable call setup data. The switching system 642 of switching module 502 makes all required connections for the telecommunications system. These include connections for actual telephone calls (such as duplex connections or conference calls), connections upon power up or reset, connections for trunk signaling, connections for built-in diagnostic tests and fault isolation tests, and connections for tone and announcement playback.

The trunk signaling system 644 of switching module 502 manages the trunk signaling functionality of each resource module. Trunk signaling resources reside on the telephony support module 506 and the interface module 504, such that the trunk signaling system 644 communicates with interface module 504 and telephony support module 506 to provide trunk signaling. In addition, the trunk signaling system 644 maintains the configuration as well as the free/busy status of each signaling resource.

The management system 646 of switching module 502 periodically services hardware to prevent system resets. The management system 646 periodically polls the system information and status register to detect a change in the bus ownership status of the switching module 502, such as a change from online to standby. The tone control system 648 of switching module 502 performs tone generation and control functions for the telecommunication system. The tone control system 648 performs playback of tones (periodic, timed and continuous) for trunk signaling and other call related functions as well as the playback of digitized announcements. The tone control system 648 causes switching module 502 to switch circuits to a predetermined time slot when a particular tone or digital announcement is needed. Each predetermined time slot is associated with a particular tone or digital announcement.

The redundancy control system 650 of switching module 502 provides support for recovering from fail over from an online switching module 502 to a standby switching module without dropping established calls. The redundancy control system 650 transfers data from the hardware and software systems of switching module 502 to the redundancy control system 650 operating on any backup switching modules 502. This data includes but is not limited to time slot switch status, call status, link access protocol status, and resource module configuration data. When a new switching module 502 is installed into the telecommunications system during operation, the redundancy control system 650 synchronizes the new switching module 502 with the telecommunications system. In addition, the redundancy control system 650 maintains periodic communications between the online switching module 502 and any standby switching modules 502 to allow the removal of a standby switching module 502 to be detected, and the addition of any new standby switching module 502 to be detected.

The hand-off processing system 652 of the switching module 502 receives hand-off data from the call processor assembly 516 and performs hand-off functions. For example, when the call processor assembly 516 determines that a hand-off is necessary, such as in response to control data received from the base transceiver stations, the hand-off processing system 652 receives the current source channel data, the new destination channel data, and performs routing of hand-off data between the source channel and destination channel digital signal processors in order to optimize the echo cancellation process.

The clock slip processing system 654 of the switching module 502 monitors the slip rate of each E-1 telecommunications channel coupled to interface modules 504. When the slip rate exceeds a predetermined alarm threshold, the clock slip processing system 654 generates an alarm and determines the direction of the slip (positive or negative). The clock slip processing system 654 also identifies the location and address of the signal processing modules 508 and associated digital signal processors for the E1 telecommunications channel, and sends telecommunications channel slip correction messages to the appropriate digital signal processors.

The clock source management system 656 of switching module 502 selects the source from which the system clock will be derived. An internal clock on the switching module 502 as well as clocks extracted from telecommunications channels connected to the interface module 504 may be selected. The clock source management system 656 also manages clock source priority by receiving operator-entered data that specifies the order in which other clocks are to be selected in the event that a telecommunications channel that is providing the system clock fails.

In operation, the redundancy control system 650 of switching module 502 obtains data from the other software and hardware systems of switching module 502 and transfers the data to the redundant switching module 502 via Ethernet interface 628 or other suitable data links. This data includes time slot switch data, telecommunications channel data, signaling data, and resource module configuration data. Data is transferred for established telecommunications channels, which occurs after the call processor assembly 516 transmits a message that indicates that the telecommunications channel is established. The redundancy control system 650 may be a synchronization client/server system 100.

FIG. 7 is a block diagram of a telephony support module 506 in accordance with one embodiment of the present invention. Telephony support module 506 is used to provide tone generation, R2 transceiver functionality, and digitized announcement functionality for a telecommunications system. Telephony support module 506 supports standard tone sets.

Telephony support module 506 includes a processor 700. Processor 700 may be a suitable processor including but not limited to a Motorola 80186 processor. Processor 700 controls the activities and functions of telephony support module 506. Telephony support module 506 also includes a maintenance port control module 702. Maintenance port control module 702 provides an RS-232 communications interface for diagnostic and troubleshooting purposes. Maintenance port control module 702 is coupled to maintenance port interface 626.

Telephony support module 506 also includes flash memory module 704. Flash memory module 704 is used to store digitized announcements. Flash memory module 704 is operable to receive control commands to initiate playback of the digitized announcements. Field programmable gate array ("FPGA") module 706 of telephony support module 506 controls flash memory module 704 playback. For example, field programmable gate array module 706 may receive control commands for playback of a digitized announcement. Field programmable gate array module 706 then generates additional control commands that cause flash memory module 704 to play back the digitized announcement.

Random access memory module 708 of telephony support module 506 provides memory storage space for code execution and data storage. Random access memory module 708 is used by the components of telephony support module 506. Telephony support module 506 also includes High Level Data Link Controller module 710. High Level Data Link Controller module 710 is a two-port serial communications controller that provides communications over two redundant High Level Data Link Controller buses 624. High Level Data Link Controller module 710 supports point-to-point local communications between the telephony support module 506 and the switching module 502.

Flash memory module 712 of telephony support module 506 stores a non-volatile copy of boot code, operational code, field programmable gate array data, digital signal processor code, and tone tables. The boot block of flash memory module 712 is hardware protected from inadvertent erasure. Voice message manager module 714 is a digital signal processor resource which is implemented in or more suitable digital signal processors. Voice message manager module 714 manages the recording and playback of digital announcements. Voice message manager module 714 provides both 8-second and 16-second messages.

Tone manager module 716 is a digital signal processor resource. Tone manager module 716 manages the generation and decoding of tones, including but not limited to dual tone multiple frequency (DTMF) tones, using a table downloaded from processor 700. This table contains such data as the time slot data, tone generation class, frequencies, levels, and other suitable data for each of the tones to be generated.

Call control manager modules 718 and 720 are digital signal processor resources. The call control manager modules manage the trunk signaling for the purposes of receiving the transmitted call routing data, such as digits. Signaling state engines are executed on the telephony support module 506 for the purpose of transmitting or receiving data over a public switch telecommunications network interface that is configured for channel-associated signaling. Multiplexer module 722 switches the time slot time division multiplex buses, operating at 8 megabits per second, from the pulse code modulation bus to the 2 megabit per second time division multiplex buses used by the digital signal processor resources and flash memory module 704.

Telephony support module 506 also includes software systems that operate on the hardware components of telephony support module 506 described above, which perform operations required for the operation of the telephony support module 506. These software systems include a code loading system 730, a digital signal processor code loading system 732, a digital signal processor interface handling system 734, a tone generation system 736, an R2 signaling system 738, a digital announcement handling system 740, a configuration management system 742, a redundancy control system 744, a local communications system 746, a testing support module 748, an alarm handling system 750, and a maintenance support system 752. Each of these systems is described in greater detail below.

The code loading system 730 of telephony support module 506 performs downloads via the switching module 502 of all software components, such as boot code, from a memory device of the call processor system 49. The digital signal processor code loading system 732 loads digital signal processor code onto the digital signal processors and initializes the digital signal processors. When all the code has been written to the digital signal processors, the digital signal processors will execute the code from internal memory.

The digital signal processor interface handling system 734 interfaces the processor 700 to the digital signal processors to initially configure all digital signal processor channels. The tone generation system 736 initializes the tone generation table so that the digital signal processor can generate the required tones. The R2 signaling system 738 performs the R2 signaling function for the purpose of receiving and transmitting call routing data over a public switched telecommunications network interface. The digital announcement handling system 740 manages the recording and playback of digital announcements. The configuration management system 742 manages the configuration of the individual digital processor channels.

The redundancy control system 744 detects changes in the telephony support module 506 bus ownership status, such as from online to standby, and transmits a message to the switching module 502 when a change in status occurs. The redundancy control system 744 of telephony support module 506 also provides support for recovering from fail-over from an online telephony support module 506 to a standby telephony support module 506 without dropping established calls. The redundancy control system 744 transfers data from the hardware and software systems of telephony support module 506 to the redundancy control system operating on any backup telephony support modules 506. This data includes but is not limited to tone data, configuration data for the digital signal processor channels, and system configuration data. When a new telephony support module 506 is installed into telecommunications switch 12 during operation, the redundancy control system 744 synchronizes the new telephony support module 506 with the telecommunications switch 12. In addition, the redundancy control system 744 maintains periodic communications between the online telephony support module 506 and any standby telephony support modules 506 to allow the removal of a standby telephony support module 506 to be detected, and the addition of any new standby telephony support module 506 to be detected.

The local communication system 746 manages communications with the switching module 502 over High Level Data Link Controller buses 624. The testing support module 748 generates a response to test commands and is also configured to make various connections required for built in tests and fault isolation tests. The alarm handling system 750 monitors the telephony support module 506 for alarm and error conditions and transmits an alarm or error message to the switching module 502 when an alarm or error condition is present. The maintenance support system 752 manages the diagnostic input and output to and from the telephony support module 506 via an RS232 port.

In operation, the redundancy control system 744 of telephony support module 506 obtains data from the other software and hardware systems of telephony support module 506 and transfers the data to the redundant telephony support module 506 via redundant High Level Data Link bus 624 or other suitable data links. This data includes tone data, digital signal processor channel configuration data, and other suitable telephony data.

The present invention provides many important technical advantages. One important technical advantage of the present invention is a system for transferring data to redundant components of a telecommunications system that uses a client/server structure. The client/server structure of the system of the present invention allows any of the redundant components to be the primary component and any of the remaining redundant components to be the standby components, such that the standby components can maintain the state of established telecommunications channels upon failure of the primary component.

Another important technical advantage of the present invention is a method for transferring data to redundant components of a telecommunications system that allows standby components to be installed while the telecommunications system is in operation. The method of the present invention provides for a complete set of synchronization data to be provided to standby components after they are installed while providing update data to existing standby components.

Although several embodiments of the present invention and its advantages have been described in detail, it should be understood that changes, substitutions, transformations, modifications, variations, and alterations may be made therein without departing from the teachings of the present invention, the spirit and the scope of the invention being set forth by the appended claims.

What is claimed is:

1. A system for transferring data to redundant components of a telecommunications system comprising:

a synchronization client operating on a first component;

a synchronization server operating on a redundant component; and wherein the synchronization client is operable to transfer predetermined data to the synchronization server upon the occurrence of a predetermined condition.

2. The system of claim 1 further comprising:

another synchronization client operating on the redundant component;

another synchronization server operating on the first component; and wherein the other synchronization client is operable to transfer predetermined data to the other synchronization server upon the occurrence of another predetermined condition.

3. The system of claim 1 further comprising a configuration data element coupled to the synchronization client, wherein the synchronization client is operable to retrieve predetermined data from the configuration data element and to transmit the predetermined data to the synchronization server.

4. The system of claim 3 further comprising one or more resource modules, wherein each resource module is operable to transfer configuration data element to the configuration data element upon activation.

5. The system of claim 1 further comprising a switch data element coupled to the synchronization client, wherein the synchronization client is operable to retrieve predetermined data from the switch data element and to transmit the predetermined data to the synchronization server.

6. The system of claim 5 further comprising a call processor operable to transmit traffic channel data to the switch data element.

7. The system of claim 1 further comprising a signaling data element coupled to the synchronization client, wherein the synchronization client is operable to retrieve predetermined data from the signaling data element and to transmit the predetermined data to the synchronization server.

8. The system of claim 7 further comprising a resource manager operable to transmit traffic channel data to the signaling data element.

9. The system of claim 1 wherein the component is a switching module and the other component is a switching module.

10. The system of claim 1 wherein the component is a telephony support module and the other component is a telephony support module.

11. The system of claim 1 wherein the component is a resource module and the other component is a resource module.

12. A method for transferring data to redundant components of a telecommunications system comprising:

receiving data at a system;

transmitting predetermined data from the system using a synchronization client; and receiving the predetermined data using a synchronization server.

13. The method of claim 12 wherein receiving data at a system comprises:

receiving configuration data at a configuration data element;

determining whether sufficient configuration data has been received to allow the system to operate; and transmitting a request for traffic channel data and signaling data.

14. The method of claim 12 wherein receiving data at a system comprises receiving traffic channel data at a switching module from a call processor.

15. The method of claim 12 wherein receiving data at a system comprises receiving signaling data at a switching module from a call processor.

16. The method of claim 12 wherein transmitting predetermined data from the system comprises transmitting configuration data from a configuration data element using the synchronization client.

17. The method of claim 12 wherein transmitting predetermined data using a synchronization client comprises transmitting traffic channel data from a switch data element using the synchronization client.

18. The method of claim 12 wherein transmitting predetermined data using a synchronization client comprises transmitting signaling data from a signaling data element using the synchronization client.

19. A method for transferring data to redundant components of a telecommunications system comprising:

activating a component;

activating a synchronization client if a redundant component has not been activated; and activating a synchronization server of the component if a redundant component has been activated.

20. The method of claim 19 further comprising:

receiving configuration data at the component from one or more resource modules if the synchronization client has been activated;

transmitting a status message from the component to signify when predetermined configuration data has been received at the component; and transmitting the configuration data from the synchronization client of the component.

21. The method of claim 19 wherein activating a component comprises activating a switching module.

22. The method of claim 19 wherein activating a component comprises activating a telephony support module.

23. The method of claim 19 wherein activating a component comprises activating a resource module.

24. The method of claim 19 further comprising:

receiving traffic channel data at the component from one or more resource modules if the synchronization client has been activated; and transmitting the traffic channel data from the synchronization client of the component.

25. The method of claim 19 further comprising:

receiving signaling data at the component from one or more resource modules if the synchronization client has been activated; and transmitting the signaling data from the synchronization client of the component.

* * * * *